Patented Sept. 30, 1952

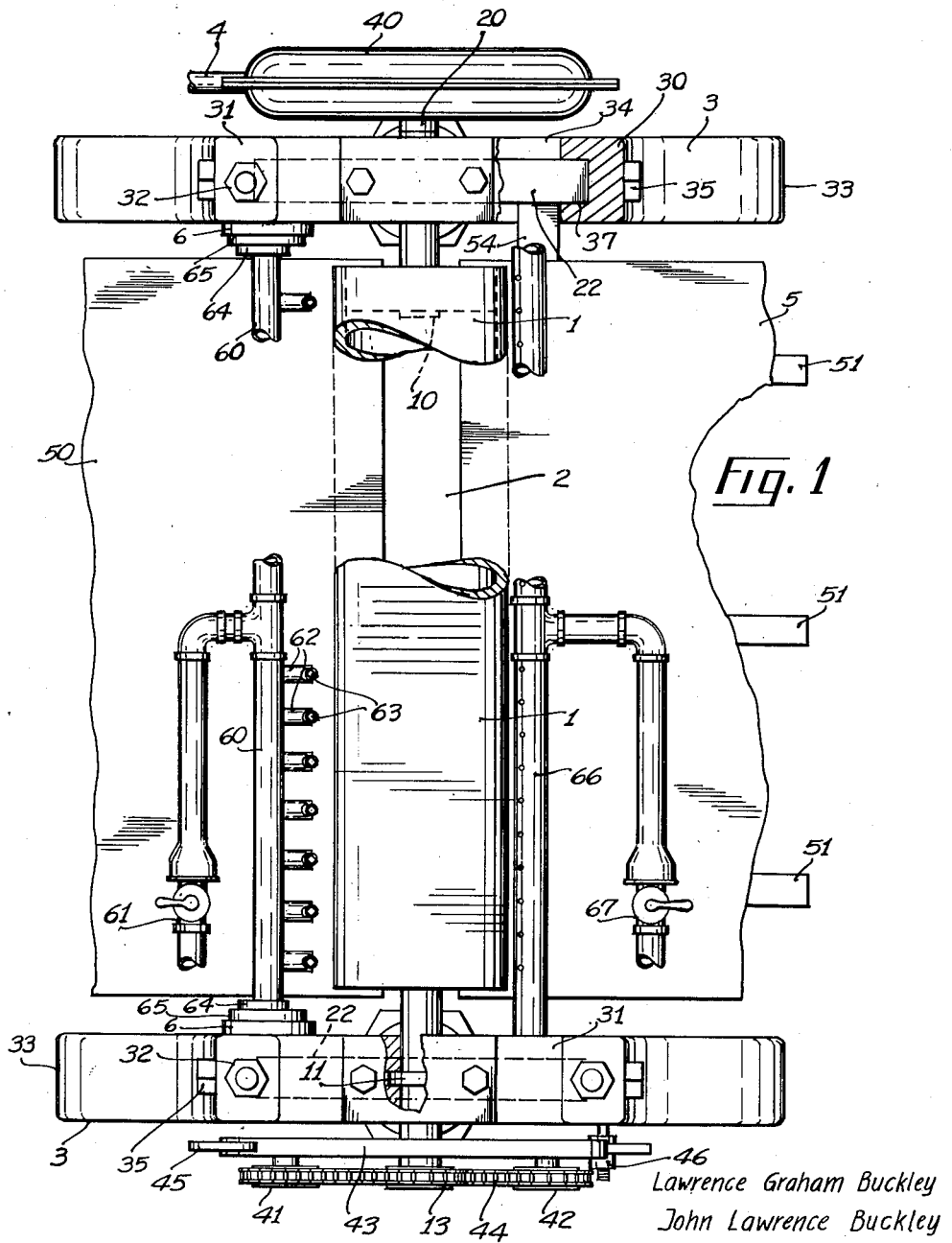

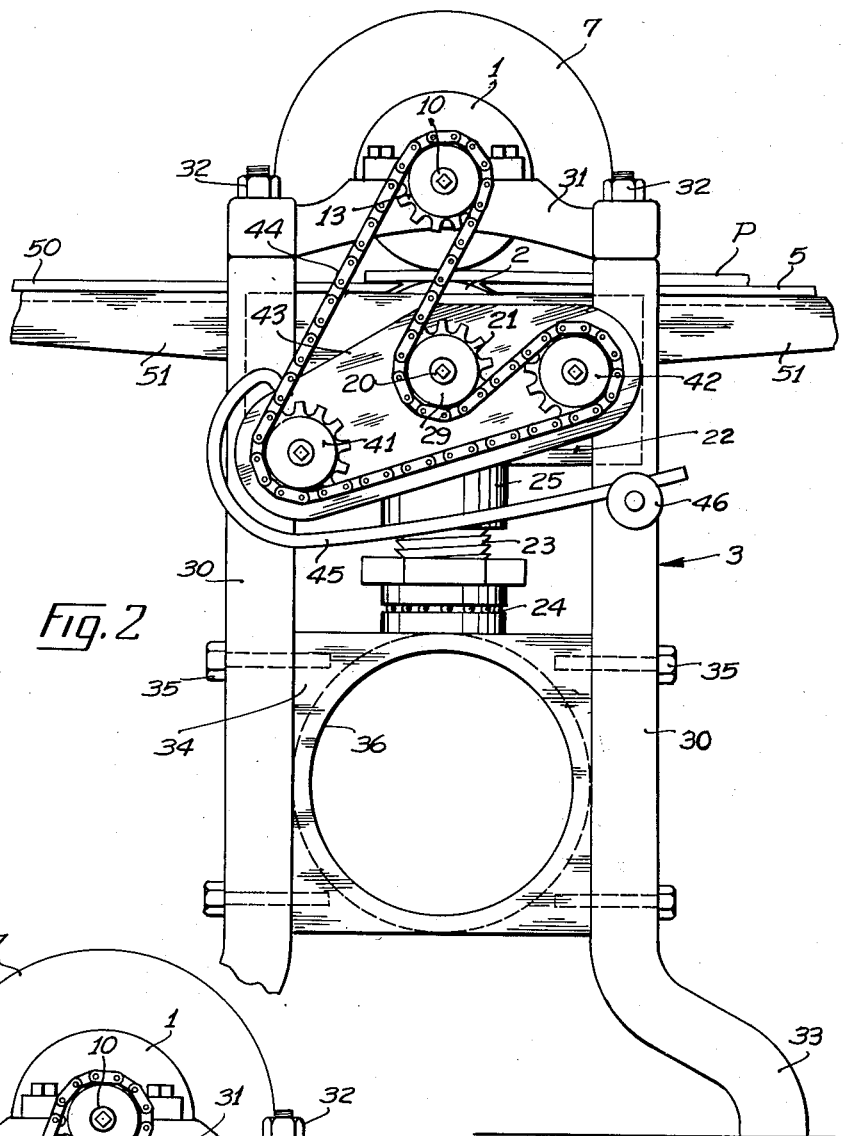

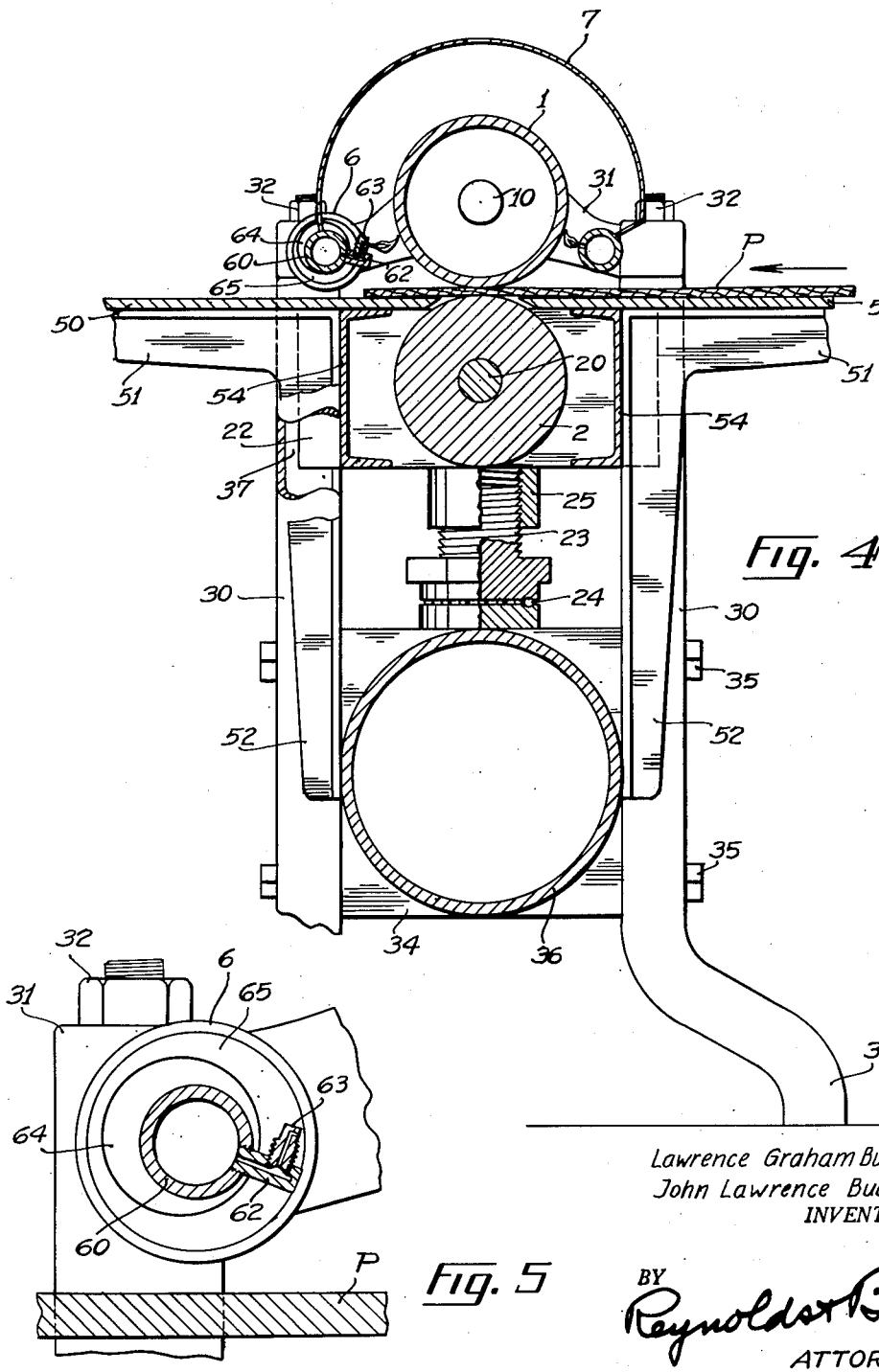

2,612,102

UNITED STATES PATENT OFFICE 2,612,102

PANEL EMBOSSING MACHINE

John Lawrence Buckley and Lawrence Graham Buckley, Olympia, Wash., assignors of one-eighth to Barbara Buckley Berken, Seattle, one-eighth to Kathleen Buckley Ogle, Mercer Island, Wash., and one-eighth to Elizabeth Buckley Martin, Eugene, Oreg.

Application June 25, 1948, Serial No. 35,176

5 Claims. (Cl. 101—8)

The embossment of designs on the surface of a wooden panel, and specifically of a plywood panel, has long been practiced, the general procedure being to pass the panel between a patterned embossing roller, rather highly heated, and a backing roller, usually unheated, employing quite appreciable pressure. Often the patterned roller is kept heated by playing gas jets upon its surface as it rotates, or by embedded electrical resistance elements.

The temperature of the patterned roller as a whole, and in each part of its length and circumference, is quite critical, although it is impossible to express any optimum temperature in degrees, for the temperature factor is one of several factors that must be coordinated, such as pressure, depth and intricacy of the pattern, speed of feed-through, the characteristics of the particular wood being embossed, and the like. Each such factor affects the others. It is, therefore, important that the heating means be capable of ready and fine regulation, not only over the whole heating arrangement, but in individual portions thereof, that is to say, in the individual jets when gas jets are the heating means, and for economy it is desirable that all heat be conserved. Prior embossing machines have left something to be desired in these fields, and improvement of prior embossing machines in these respects is an object of this invention.

As with temperature, pressure regulation varies with coordinate factors, and requires fine adjustment, notwithstanding the very appreciable total values involved, which may be from 45,000 to 100,000 pounds across the 48 inch width of a wall panel. Likewise, plywood panels will vary in thickness, either among those nominally alike, or as between different standard thicknesses. The provision of means to enable convenient, rapid adjustments in pressure, to fine degrees of adjustment in values that run quite high, is a further object of this invention.

The patterned roller is necessarily in excess of 48 inches in length, preferably at least eight inches in diameter to avoid too frequent repetition of the design, and quite heavy, in order that it may have the necessary rigidity throughout its length. Good mechanical design would locate the bearings as close to its ends as possible. However, it must be highly heated, sometimes to perceptible incandescence, so that normal bearings of the type required to withstand the pressures and other loads involved, and to maintain the roller located as accurately as is required, while yet compensating for thermal expansion, would be adversely affected by the existing conditions. The provision of a roller, of bearings therefor, and of bearing supports capable of withstanding the high loadings involved, yet of maintaining accuracy, and the protection of the bearings from the heat over the whole length of the roller, without at the same time so complicating the design as to make it prohibitively expensive in or unsuited for use in a wood-working plant, is a still further object of this invention.

Adjustment being required for different standard thicknesses of panel, and the patterned roller—usually the upper one of the pair, for it must be changed from time to time—being non-adjustably mounted, it is necessary to mount the even heavier backing roller for vertical adjustment. This introduces complications in that the large panels must be supported by and fed across a feed table and a discharge table, which in turn suggests that the tables be mounted for adjustment on the same support as the backing roller. The assembly, which must be adjusted to a fine degree and held accurately in position, becomes so heavy and unwieldy that it is difficult to support and brace it for such purposes, and the means to that end tend to become complicated and expensive, and too delicate to continue to function in the atmosphere of a woodworking plant, where fine wood dust penetrates everywhere, yet simpler means heretofore proposed have been subject to difficulties arising from unbalance, such as is bound to occur, and consequent cooking, sticking, failure to adjust correctly, and excessive wear. The provision of a mount for the backing roller and associated tables, permitting accuracy of adjustment and thorough, long-continuing dependability is an object of this invention.

Speaking generally, such machines must be simple, not unduly expensive, very rugged, and capable of operation by a minimum number of workmen. The provision of a design having such characteristics in a high degree is an object of this invention.

Notwithstanding adjustments to different thicknesses, it is desirable that a single drive positively connecting the upper and lower rollers, and suited to and self-compensating for all such adjustments, be provided. Moreover, for ready substitution of one patterned roller for another, the drive means and the pressure means must be quickly releasable or shiftable. The accomplishment of these ends is a further object of this invention.

Speaking generally, the present invention aims at improving known embossing machines in the particular ways indicated above, and in other similar ways, as well appear more clearly hereinafter.

In the accompanying drawings the invention is shown embodied in a typical form, capable of achieving the objects set forth hereinabove, but it will be understood that various changes may be made in the form, character and relative arrangement of the parts, within the principles of the invention as hereinafter set forth, without departing from the spirit of this invention.

Figure 1 is a plan view, partly broken away, showing such a panel-embossing machine.

Figure 2 is an end elevation of the same with the drive interconnection in the operative position of adjustment, and Figure 3 is a similar view showing parts in an inoperative position of adjustment, such as might be necessary preparatory to changing embossing rolls.

Figure 4 is a longitudinal, vertical section through the panel-embossing machine.

Figure 5 is a detail section on a longitudinal vertical plane, illustrating the adjustable mounting for the gas heater jets.

The embossing is effected between two parallel rollers, preferably disposed one above the other, and spaced slightly apart by a distance somewhat less than the initial thickness of the panel which is to be embossed. While the relative disposition of the rollers might be reversed, it is greatly to be preferred that the embossing roller 1 be the upper roller, and the lower roller 2 is the pressure or backing roller, although its precise nature is not material. Both, while cooperating in the embossing of a panel P, are relatively fixed with their respective shafts 10 and 20 parallel, but adjustment of the spacing between the rollers is possible, as will be explained shortly. The pressure roller 2 may be solid, so long as it is not heated, but the embossing roller 1 is preferably hollow whereby it transfers a minimum of heat to its bearings by way of its stub shafts 10, and permits closer inboard location of those bearings than would otherwise be practicable.

The stub shafts 10 of the upper roller are fixedly, although removably, journaled at each end in a cap 31 which is in effect part of the end frame about to be described, although the cap is removably secured, as by the nuts 32, rigidly upon the upper end of such an end frame, generally designated by the numeral 3. Each such end frame is simply constructed, in the embodiment shown, of upright posts 30, terminating at their bottom in feet 33, spaced apart but rigidly connected together by the crosspieces 34, to which the uprights 30 are bolted at 35, and the two end frames (preferably the crosspieces 34 thereof) are rigidly connected together by means such as the cylindrical transverse stiffener 36, which may be a twelve-inch steel pipe section. Each upright post is slotted vertically, above the crosspiece 34, as is indicated in Figure 4 at 37. The assembly constitutes a very rigid, unitary frame, of simple, inexpensive construction, and very considerable forces of pressure and reaction can occur between the caps 31 and the crosspieces 34, the stiffener 36 holding the two ends against rocking, even though there is no other connection across a span of some six feet.

Slidable vertically within the slots 37, at each end of the machine, is a slide 22 formed of a piece of heavy steel plate. This slide provides a journal bearing, one at each end, for the shaft 20 supporting the pressure roller 2. By supporting the slide 22 from below for vertical adjustment, as, for instance, by the adjusting screw 23 bearing at 24 upon the crosspiece 34 and stiffener 36, and threaded within the nut 25 directed downwardly from the slide 22, such vertical adjustment may be accomplished by small increments and with great precision, yet parts may be held quite strongly and accurately in any adjusted position. Moreover, no part of the pressure roller, its support, nor its adjustment means, is in the way of replacing the heavy patterned roller 1 with one of a different design, in a manner shortly to be described. If desired or necessary, locking means may be provided to secure the rotative screw 23 in any adjusted position.

At one end of the roller 1, being the end where drive interconnections are arranged between the two rollers, the shaft 10 is provided with end thrust bearing means, indicated at 11, whereby this end of the roller will not shift axially, but the complemental shaft 10 at the opposite end of the roller is mounted in its cap 31 in a manner which permits axial expansion or contraction, which occurs by reason of the heating or cooling of the patterned embossing roller. The heating is caused by gas jets yet to be described. Similar provisions are unnecessary in connection with the lower pressure roller 2, since this is not heated.

Since the caps 31 are in effect a part of each end frame, yet are removable therefrom, it follows that a differently patterned roller 1 may be substituted for one previously used. There being nothing above the roller 1, once the bearing caps are removed, it is a simple matter to lift the roller out and to journal a new roller in the bearings, or, if each roller is assembled with its own caps and bearings, then by substituting a new roller and its caps for the old. Furthermore, while the adjustment by means of the screw 23 provides for a given range of thickness of panel, that is to say, for a given range of spacing between the closest points in the peripheries of the rollers 1 and 2, if a greater range of spacing is desired, shims may be inserted or removed between the caps 31 and the upper ends of the posts 30.

Preferably the main drive from the shaft 4 is by way of high reduction gearing within the casing 40, to the lower shaft 20, and thence through a friction clutch at 29 to the pressure roller 2 at its opposite end, and by interconnections at this opposite end to the shaft 10 and roller 1. Either in the drive interconnection mentioned, wherein differences between the rollers are absorbed in slipping of the clutch at 29, or by making the rollers 1 and 2 of substantially identical diameter, they are synchronized so that there is no appreciable slippage with relation to a panel P fed between them.

The drive interconnection includes a sprocket wheel 13 on the shaft 10 and a sprocket wheel 21 on the shaft 20, the two sprocket wheels 13 and 21 being substantially identical. However, the drive is preferably not directly and solely between these two sprocket wheels, but, in addition, two sprocket wheels 41 and 42 are mounted at opposite ends of a lever 43 which is rockable, intermediate its ends, about the axis of one of the shafts, such as the shaft 20. The sprocket chain 44 passes reversely about the sprocket wheels 13 and 21 and about the sprocket wheels 41 and 42, in the manner best shown in Figure 2, and hence, by rocking the lever 43 counterclockwise, as viewed in Figure 2, the chain 44 is tightened. This result may be achieved by means of a handle 45 which is somewhat resilient, which is engaged with one end of the lever 43 and which may have its opposite ends retained in any convenient way, as by a stud 46 on the end frame 3, so located as to flex the handle 45 somewhat.

It will be clear that the flexure of the resilient handle 45 will serve to tension the drive chain 44, and to effect compensating adjustment automatically for minor variations in spacing, yet will not resist a rather wide range of adjustment of the spacing between the shafts 10 and 20, but will accommodate itself automatically to such adjustments, and that its range will include the thicknesses of all panels that it may be desired to emboss. Furthermore, if it is desired to remove the patterned roller 1, which involves disconnection of the drive chain 44, such disconnection may readily be effected by disengaging the handle 45 from its retaining stud 46 in the manner shown in Figure 3, whereupon by rocking of the lever 43 in a clockwise direction, the chain 44 becomes slack and may be lifted from the sprocket wheel 13, after which the patterned roller 1 may readily be removed by release of the nuts 32 and lifting off the caps 31.

There will be at least one panel-supporting table in conjunction with the embossing rollers, and usually there will be two such panel-supporting tables, a feed table and an off-bearing table. Moreover, since it is the lower roller 2 which is normally adjustable upwardly and downwardly, and since the panel-supporting table or tables should have its or their upper surface in a plane which is substantially tangent at all times with the roller 2, regardless of vertical adjustment of the latter, it follows that the panel-supporting table or tables should be adjustable vertically at the same time, and preferably by the same means and to the same extent, as the roller 2. This end may be achieved by connecting the slides 22 at opposite ends by the transverse members shown in the form of angle beams 54, and by supporting the panel supporting tables 5 and 50 from the vertically slidable frame thus constituted. Since the panel-supporting tables will have appreciable cantilever extension beyond the slides 2 and beams 54, and thus may often tend to tilt the slides 22 about their points of support at the screws 23 and nuts 25, and that this if permitted would make adjustment often impossible, and would produce wear and inaccuracy, it is necessary to brace the tables in a thorough yet simple manner, and this has been done by bracing them from the transverse members 54 by means of braces 51, and by extending downwardly the vertical arms 52 of these braces to such length and so located as to engage the sides of the stiffener 36 at moment arms well below the tables and their point of support. Thus the stiffener, in addition to connecting and constituting with the end frame 3 a rigid machine frame, serves also as a guide and brace reaction point for the vertically slidable panel-supporting tables 5 and 50, in such manner as greatly facilitates their adjustment and avoids cocking and sticking, yet by an extremely simple construction.

As has already been indicated, the patterned roller 1 is heated to assist in the embossing operation. While various means of heating might be employed, it has been found very convenient to employ multiple gas jets distributed along the length of the roller 1, individually controllable, as well as jointly, to keep all parts of the roller heated to exactly the correct temperature. A transverse gas header or supply pipe is indicated at 60, supplied past a metering valve 61 from any suitable source, and at intervals individual jets consisting of the nipples 62 and bored pipe plugs 63 extend from the header 60 toward the roller 1. By the use of this construction each pipe plug 63 may be screwed in or out to whatever extent may be desired, and the supply of gas from any individual jet may be adjusted or cut off completely without affecting the supply to other jets. Thus there is possible individual regulation of the several jets, so that the roller 1 may be properly heated in all parts, and not over or under heated anywhere. Moreover, in order to vary the spacing towards and from the roller of the jet system as a whole, or the location of its zone of impingement upwardly or downwardly, the header 60 is supported eccentrically of a disk 64 (see Figure 5), which, in turn, is supported eccentrically of a disk 65, and the latter is supported within a rim 6 carried by the caps 31 or other convenient frame elements. By relatively adjusting the eccentricity of the disks 64 and 65 and of the header 60, a very appreciable range of adjustment in and out or up and down of the zone of impingement of the gas jets from the individual burners 63 is possible.

In addition to the burners 63, which are the primary heating means for the roller 10, we provide a multiple-apertured gas header 66 at the opposite side of the roller, supplied from any convenient source past the valve 67, and this is used, preferably at the commencement of operations, to assist in the more rapid warming up of the roller than would be possible from the single row of jets 63. Normally, after the roller is adequately warmed up the valve 67 is closed, and the auxiliary jets from the header 66 are cut off.

In order to converse the heat in the roller, it may be surrounded or encased within a hood 7 which overlies it and encloses all the gas jets. This hood also will guard in some measure against accidental contact with the hot roller 10 and consequent serious burns to the operator.

It is believed that the mode of operation will be apparent. Adjusting the spacing between the rollers to something less than the thickness of the panel to be operated on, the panel resting upon the feed table 5 is advanced and its leading edge is entered between the two rollers 1 and 10. The roller 1 has previously been properly (usually uniformly) heated as it rotates. These rollers, turning slowly, press down upon the panel, and the heated roller 1 leaves its impress upon the upper surface of the panel as the latter is slowly fed through between the two rollers. Finally the panel emerges and rests upon the off-bearing table 50, whence it is removed. If a panel of different thickness is to be embossed, the spacing between the rollers 1 and 2 is adjusted accordingly, either through the screws 23 or by the insertion or removal of shims between the cap 31 and the end frame 3. In all such adjustments, due to the resilience of the handle 45, the drive interconnection between the rolls remains constant and maintains precise synchronism between the rolls 1 and 2. Whenever a differently-patterned roller 1 is to be used, the handle 45 is disengaged and dropped down, thus slacking off the chain 44 and permitting removal of the upper roller 1 and its end cap 31, and a substitution of a similar roller and reengagement of the drive therewith in the reverse fashion. The subassembly consisting of the backing roll 2, slides 22, beams 54, tables 5, 50, and the braces 51, 52 is heavy, and is subjected to unbalanced forces such as the weight of a panel on the table 5, or on the table 50, and yet it must be accurately and delicately adjusted. The delicacy of adjustment is accomplished by the screws 23 and nuts 25, reacting between the rigid frame crosspieces 34, stiffened at the bearing point by the low placed stiffener 36, and the equally rigid slides 22 wherein the roller 2 is directly journaled, but only because no attempt is made to guide the slides during their vertical adjustment. The ends of the slides 22 are confined loosely within the slots 37, so that they bear against the end frames, relative to which they can not be appreciably displaced, but since they are not confined closely, neither can they cock or stick, as a result of the unbalanced forces to which they may be subjected, and which might effect such a result in a guide fitting as closely as the delicacy of adjustment might indicate is required.

We claim as our invention:

1. In a machine for embossing material such as plywood panels, two end frames spaced apart by a distance in excess of the width of such panels, a stiffener rigidly connecting said end frames near their lower ends, an upper roller fixedly journaled in but upwardly removable from the upper portions of said end frames, a lower roller disposed parallel to and spaced at its periphery slightly below the upper roller but above said stiffener, a frame mounted in said rigidly connected end frames for vertical movement, and including two slides guided one in each of said end frames for generally vertical movement, but not against tilting, and beams rigidly interconnecting said slides, and bearing against the uprights of the end frames, a panel-supporting table supported from said vertically movable end frame, said lower roller being journaled in the vertically movable frame, means reacting from the end frames and stiffener upwardly against said slides to adjust the spacing between said rollers, one at least of said rollers being patterned and the other constituting a cooperating pressure roller, drive means operatively and positively interconnecting said rollers for synchronous rotation in all their relatively adjusted positions, and brace means rigid with but depending vertically from said movable frame and bearing at both sides of the stiffener to maintain the same against tilting in all its vertically adjusted positions.

2. In a machine as in claim 1, characterized in that the panel-supporting table extends approximately the length of a panel at each side of said vertically movable frame, opposite the gap between the rollers, its surface being located in a plane substantially tangent to the uppermost periphery of the lower roller, and is maintained substantially level by the bracing engagement of the depending bracing means with the stiffener.

3. In a machine for embossing panels, or for like purposes, a patterned roller and a pressure roller rotative about parallel axes to leave their peripheries spaced apart a distance somewhat less than the panel's thickness, means to adjust the spacing between the rollers' peripheries, drive means interconnecting said rollers to rotate them substantially in synchronism to advance a panel entered between them, and including two sprocket wheels of substantially identical size mounted upon the same end of the respective rollers, a lever rockable between its ends about the axis of one roller, two additional sprocket wheels journaled at the opposite ends of said lever, a drive chain extending oppositely about said first two sprocket wheels and then about said second two sprocket wheels, and a resilient handle connected at one end to said lever, and a fixed retainer engageable with the handle's opposite end to stress it and thereby to tighten the chain, but disengageable therefrom for slackening the chain.

4. In a machine for embossing plywood panels, or for like purposes, in combination with a patterned embossing roller and a companion backing roller spaced apart for passage therebetween of a panel to be embossed, means to heat said patterned roller comprising a fuel gas conduit disposed lengthwise of and adjacent the patterned roller, a plurality of nipples projecting from said conduit at intervals spaced lengthwise thereof, and each having its bore closed at its outer end, a plug bored to define a jet-like outlet, received in and disposed transversely of each nipple, and normally communicating with the nipple's bore, but adjustable relative to its nipple to vary or to close off the exit of gas, and so to vary the intensity of heating of the roller by such jet independently of the heating by all other jets.

5. A machine as in claim 4, including additionally means to adjust the position of the gas conduit, and of its individually adjusted jets, bodily relative to the patterned roller, to vary the over-all intensity of heating of the roller without variation of the relative intensity of heating by the individual jets.

JOHN LAWRENCE BUCKLEY.
LAWRENCE GRAHAM BUCKLEY.

REFERENCES CITED

The following references are of record in the file of this patent:

UNITED STATES PATENTS

| Number | Name | Date |
|---|---|---|
| 510,162 | Crist | Dec. 5, 1893 |
| 1,500,961 | Reiber | July 8, 1924 |
| 2,040,998 | Jump | May 19, 1936 |
| 2,202,110 | Maurer | May 28, 1940 |
| 2,469,526 | Sloat | May 10, 1949 |